United States Patent
Kawamoto et al.

(10) Patent No.: US 12,444,765 B2
(45) Date of Patent: Oct. 14, 2025

(54) CATALYST LAYER, CATALYST LAYER INK AND MEMBRANE-ELECTRODE ASSEMBLY

(71) Applicant: AGC INC., Tokyo (JP)

(72) Inventors: Masako Kawamoto, Tokyo (JP); Satoru Hommura, Tokyo (JP)

(73) Assignee: AGC INC., Tokyo (JP)

( * ) Notice: Subject to any disclaimer, the term of this patent is extended or adjusted under 35 U.S.C. 154(b) by 435 days.

(21) Appl. No.: 17/849,795

(22) Filed: Jun. 27, 2022

(65) Prior Publication Data

US 2022/0367896 A1 Nov. 17, 2022

Related U.S. Application Data

(63) Continuation of application No. PCT/JP2020/048482, filed on Dec. 24, 2020.

(30) Foreign Application Priority Data

Dec. 27, 2019 (JP) ................... 2019-237794

(51) Int. Cl.
- *H01M 8/1025* (2016.01)
- *H01M 4/96* (2006.01)
- *H01M 8/1004* (2016.01)

(52) U.S. Cl.
CPC ........... *H01M 8/1025* (2013.01); *H01M 4/96* (2013.01); *H01M 8/1004* (2013.01)

(58) Field of Classification Search
CPC .... H01M 8/1025; H01M 4/96; H01M 8/1004; H01M 4/881; H01M 8/1023; H01M 8/1039; H01M 4/9041
See application file for complete search history.

(56) References Cited

U.S. PATENT DOCUMENTS

| | | | |
|---|---|---|---|
| 2005/0266291 A1* | 12/2005 | Watakabe | ............. C08F 214/18 429/535 |
| 2015/0030962 A1 | 1/2015 | Hommura et al. | |
| 2018/0051159 A1* | 2/2018 | Hommura | ............... H01M 8/02 |

FOREIGN PATENT DOCUMENTS

| | | |
|---|---|---|
| CN | 102473473 A | 5/2012 |
| CN | 107922703 A | 4/2018 |

(Continued)

*Primary Examiner* — Daniel S Gatewood
(74) *Attorney, Agent, or Firm* — Element IP, PLC

(57) ABSTRACT

The present invention provides a catalyst layer, a catalyst layer ink and a membrane-electrode assembly which enable provision of fuel cells with high power efficiency. The catalyst layer of the present invention comprises a carbon alloy catalyst and an ion exchange polymer which comprises at least one species of units having a cyclic ether structure selected from the group consisting of units represented by the formula (u11), units represented by the formula (u12), units represented by the formula (u21), units represented by the formula (u22) and units represented by the formula (u24).

(Continued)

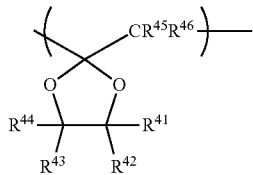

(u21)

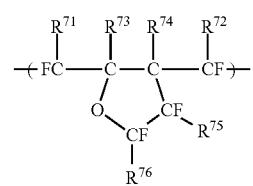

(u24)

14 Claims, 1 Drawing Sheet

(u22)

(56) References Cited

FOREIGN PATENT DOCUMENTS

| | | | |
|---|---|---|---|
| EP | 4050041 A1 | 8/2022 | |
| JP | 2003249231 A | 9/2003 | |
| JP | 2004362802 A | * 12/2004 | |
| WO | WO-2015147131 A1 | 10/2015 | |
| WO | WO-2017033685 A1 | * 3/2017 | .......... C08F 214/262 |

* cited by examiner

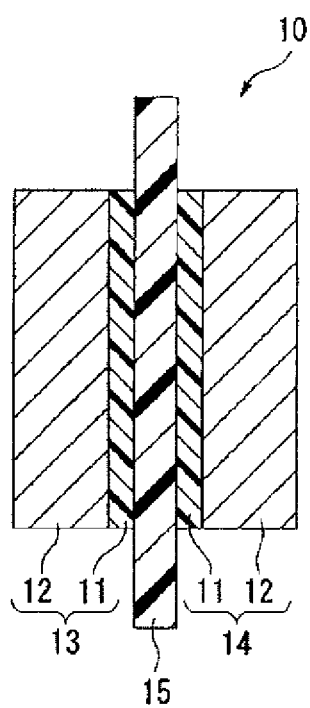

CATALYST LAYER, CATALYST LAYER INK AND MEMBRANE-ELECTRODE ASSEMBLY

TECHNICAL FIELD

The present invention relates to a catalyst layer, a catalyst layer ink and a membrane-electrode assembly.

BACKGROUND ART

The membrane-electrode assembly in polymer electrolyte fuel cells generally comprises an anode and a cathode each having a catalyst layer comprising a catalyst and an ion exchange polymer, and a polymer electrolyte membrane sandwiched between the anode and the cathode.

In the catalyst layers, noble metals with high oxygen-reducing activity such as platinum and palladium and their alloys are widely used as the catalyst. However, because of the problem that noble metals are costly and rare substances, catalysts with a much lower, even zero, platinum content have been developed for widespread use of fuel cells.

Among them are carbonization products which have oxygen-reducing activity in themselves, proposed as highly active carbon catalysts free or almost free of expensive noble metals such as platinum and platinum alloys. Such carbon catalysts are produced by carbonizing a mixture of an organic substance and a metal into a catalytically active carbon material (carbon alloy catalyst).

Patent Document 1 discloses a catalyst layer comprising a carbon alloy catalyst and an ion exchange polymer, Nafion (registered trademark). The carbon alloy catalyst is obtained by carbonizing a mixture of a thermosetting resin that produces a non-graphitizing carbon (such as polyfurfuryl alcohol, a furan resin and a phenol resin) and a compound of a metal (such as iron, cobalt and nickel).

Patent Document 2 discloses production of a carbon alloy catalyst using a thermoplastic resin such as polyvinyl chloride or polyvinyl alcohol instead of the thermosetting resin in Patent Document 1, which comprises oxidative infusibilization of a thermoplastic resin mixed with a compound of Co and/or Fe and carbon black under an oxygen atmosphere, followed by carbonization of the thermoplastic resin under heating at 800 to 1000° C.

Patent Document 3 discloses a fuel cell electrode (catalyst layer) based on nitrogen- and/or boron-doped carbon alloy fine particles. As such a carbon alloy catalyst, it specifically discloses a nitrogen-doped carbon alloy catalyst produced by reaction of a nitrogen-containing compound such as phthalocyanine with a precursor of a thermosetting resin such as furan resin under heating, heat-treatment of the resulting thermosetting resin containing a nitrogen-containing compound at a temperature of from 400 to 1500° C., and pulverization.

PRIOR ART DOCUMENTS

Patent Documents

Patent Document 1: JP-A-2003-249231
Patent Document 2: WO2015/147131
Patent Document 3: JP-A-2004-362802

DISCLOSURE OF INVENTION

Technical Problem

Recent years have seen a demand for further improvement of power efficiency of fuel cells. The present inventors assessed catalyst layers containing a carbon alloy catalyst like those disclosed in Patent Document 1 and found that these catalyst layers need some improvement in order to provide fuel cells with sufficient power efficiency.

In view of the above-mentioned circumstances, the present invention aims to provide a catalyst layer, a catalyst layer ink and a membrane-electrode assembly, which enable provision of fuel cells with high power efficiency.

Solution to Problem

As a result of their extensive studies on the above-mentioned problem, the present inventors have found that a catalyst layer comprising a carbon alloy catalyst and an ion exchange polymer can provide fuel cells with high power efficiency when the polymer comprises specific units having a cyclic ether structure and have arrived at the present invention.

Namely, the present inventors have found the following solutions to the above-mentioned problem.

[1] A catalyst layer comprising a carbon alloy catalyst and an ion exchange polymer which comprises at least one species of units having a cyclic ether structure selected from the group consisting of units represented by the after-mentioned formula (u11), units represented by the after-mentioned formula (u12), units represented by the after-mentioned formula (u21), units represented by the after-mentioned formula (u22) and units represented by the after-mentioned formula (u24):

wherein in the formula (u11), $R^{11}$ is a bivalent perfluoro organic group which may have an ethereal oxygen atom, each of $R^{12}$, $R^{13}$, $R^{15}$ and $R^{16}$ is independently a monovalent perfluoro organic group which may have an ethereal oxygen atom or a fluorine atom, and $R^{14}$ is a monovalent perfluoro organic group which may have an ethereal oxygen atom, a fluorine atom or a group represented by $—R^{11}(SO_2X(SO_2R^f)_a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom, in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by $—R^{21}(SO_2X(SO_2R^f)_a)^-M^+$ wherein $M^+$, $R^f$, X and a are the same as defined above, in the formula (u21), each of $R^{41}$, $R^{42}$, $R^{43}$, $R^{44}$, $R^{45}$ and $R^{46}$ is independently a monovalent perfluoro organic group which may have an ethereal oxygen atom or a fluorine atom, in the formula (u22), s is 0 or 1, each of $R^{51}$ and $R^{52}$ is independently a fluorine atom, a $C_{1-5}$ perfluoroalkyl group or may form a spiro ring together with each other (when s is 0), each of $R^{53}$ and $R^{54}$ is independently a fluorine atom or a $C_{1-5}$ perfluoroalkyl group, and $R^{55}$ is a fluorine atom, a $C_{1-5}$ perfluoroalkyl group or a $C_{1-5}$ perfluoroalkoxy group, and in the formula (u24), each of $R^{71}$, $R^{72}$, $R^{73}$, $R^{74}$, $R^{75}$ and $R^{76}$ is independently a monovalent perfluoro organic group which may have an ethereal oxygen atom or a fluorine atom.

[2] The catalyst layer according to [1], wherein the total content of units having a cyclic ether structure is at least 30 mol %, relative to all units in the polymer.

[3] The catalyst layer according to [1] or [2], wherein the units having a cyclic ether structure comprise units represented by the formula (u22).

[4] The catalyst layer according to any one of [1] to [3], wherein the polymer further comprises units based on a perfluoro monomer which do not have a cyclic ether structure and have an ion exchange group.

[5] The catalyst layer according to according to [4], wherein the units based on a perfluoro monomer are units represented by the after-mentioned formula (u32): wherein in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoro organic group, q is 0 or 1, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom.

[6] The catalyst layer according to according to any one of [1] to [5], wherein the polymer has an ion exchange capacity of from 1.1 to 2.8 meq/g dry resin.

[7] The catalyst layer according to according to any one of [1] to [6], wherein the polymer has a volume flow rate value of 200 to 330° C.

[8] A catalyst layer ink which comprises a carbon alloy catalyst, an ion exchange polymer which comprises at least one species of units having a cyclic ether structure selected from the group consisting of units represented by the after-mentioned formula (u11), units represented by the after-mentioned formula (u12), units represented by the after-mentioned formula (u21), units represented by the after-mentioned formula (u22) and units represented by the after-mentioned formula (u24), and a solvent:
wherein in the formula (u11), $R^{11}$ is a bivalent perfluoro organic group which may have an ethereal oxygen atom, each of $R^{12}$, $R^{13}$, $R^{15}$ and $R^{16}$ is independently a monovalent perfluoro organic group which may have an ethereal oxygen atom or a fluorine atom, and $R^{14}$ is a monovalent perfluoro organic group which may have an ethereal oxygen atom, a fluorine atom or a group represented by —$R^{11}(SO_2X(SO_2R^f)_a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom,
in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by —$R^{21}(SO_2X(SO_2R^f)_a)^-M^+$ wherein $M^+$, $R^f$, X and a are the same as defined above,
in the formula (u21), each of $R^{41}$, $R^{42}$, $R^{43}$, $R^{44}$, $R^{45}$ and $R^{46}$ is independently a monovalent perfluoro organic group which may have an ethereal oxygen atom or a fluorine atom,
in the formula (u22), s is 0 or 1, each of $R^{51}$ and $R^{52}$ is independently a fluorine atom, a $C_{1-5}$ perfluoroalkyl group or may form a spiro ring together with each other (when s is 0), each of $R^{53}$ and $R^{54}$ is independently a fluorine atom or a $C_{1-5}$ perfluoroalkyl group, and $R^{55}$ is a fluorine atom, a $C_{1-5}$ perfluoroalkyl group or a $C_{1-5}$ perfluoroalkoxy group, and in the formula (u24), each of $R^{71}$, $R^{72}$, $R^{73}$, $R^{74}$, $R^{75}$ and $R^{76}$ is independently a monovalent perfluoro organic group which may have an ethereal oxygen atom or a fluorine atom.

[9] The catalyst layer ink according to [8], wherein the total content of units having a cyclic ether structure is at least 30 mol %, relative to all units in the polymer.

[10] The catalyst layer ink according to [8] or [9], wherein the units having a cyclic ether structure comprise units represented by the formula (u22).

[11] The catalyst layer ink according to any one of [8] to [10], wherein the polymer further comprises units based on a perfluoro monomer which do not have a cyclic ether structure and have an ion exchange group.

[12] The catalyst layer ink according to [11], wherein the units based on a perfluoro monomer are units represented by the after-mentioned formula (u32):
wherein in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoro organic group, q is 0 or 1, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom.

[13] A membrane-electrode assembly which comprises an anode having a catalyst layer, a cathode having a catalyst layer and a polymer electrolyte membrane sandwiched between the anode and the cathode, wherein at least one of the catalyst layer in the anode and the catalyst layer in the cathode is the catalyst layer as defined in any one of [1] to [7].

[14] The membrane-electrode assembly according to [13], which is used for a polymer electrolyte fuel cell.

Advantageous Effects of Invention

According to the present invention, it is possible to provide a catalyst layer, a catalyst layer ink and a membrane-electrode assembly capable of forming a fuel cell with high power efficiency.

BRIEF DESCRIPTION OF DRAWINGS

[FIG. 1] A schematic cross-sectional view of an embodiment of the membrane-electrode assembly of the present invention.

DESCRIPTION OF EMBODIMENTS

The terms used herein have the following meanings.

A "unit" in a polymer mean an atomic group derived from one molecule of a monomer by polymerization. A unit may be an atomic group directly formed by a polymerization reaction, or may be an atomic group having a partially different structure obtained by polymerization followed by partial structural conversion. The ratios (mol %) of respective species of units in a polymer relative to all the units in the polymer can be determined by analyzing the polymer by NMR spectroscopy.

A "precursor group for an ion exchange group" means a group which can be converted to an ion exchange group by treatments such as hydrolysis, conversion to an acid form and conversion to a salt with a different metal by cation exchange.

"TQ value" is the volume flow rate value of a polymer and is measured as described in Examples. TQ value is a measure of molecular weight.

A numerical range expressed by using "to" includes the figures before and after "to" as the lower limit and the upper limit.

A unit represented by the formula (u11) is referred to as a unit (u11). Units represented by other formulae are also referred to in the same manner.

A monomer represented by the formula (m11) is referred to as a monomer (m11). Monomers represented by other formulae are also referred to in the same manner.

A group represented by the formula (g1) is referred to as a group (g1). Groups represented by other formulae are also referred to in the same manner.

A unit having a cyclic ether structure selected from the group consisting of units (u11), units (u12), units (u21), units (u22) and units (u24) is referred to as a "specific cyclic ether unit".

A monomer (m11), a monomer (m12), a monomer (m21), a monomer (m22) and a monomer (m24) is referred to as a "specific cyclic monomer", collectively.

A "carbon alloy catalyst" means a catalyst which uses a carbon alloy. According to the definition by the Carbon Society of Japan, "carbon alloys are material mainly composed of carbon atoms in multi-component systems, in which each component has physical and/or chemical interaction with each other. Here, carbons with different hybrid orbital are denoted as different components." This definition of "carbon alloy" applies hereto.

[Catalyst Layer]

The catalyst layer of the present invention (hereinafter referred to as "the present catalyst layer") comprises a carbon alloy catalyst and an ion exchange polymer (hereinafter referred to as a polymer (H)) comprising specific cyclic ether units.

The present catalyst layer enables provision of a fuel cell having high power efficiency. The reason is still unclear, but is supposed to be as follows.

Owing to the presence of cyclic ether units, the polymer (H) has high oxygen permeability, as compared to Nafion (registered trade name, manufactured by DuPont de Nemours, Inc.) and promotes the catalytic activity of the carbon alloy catalyst, and therefore, it is possible to provide a fuel cell with high power efficiency.

<Carbon Alloy Catalyst>

As the carbon alloy catalyst, a known carbon alloy may be used.

For example, a nanoshell-containing carbon alloy mainly composed of a non-graphitizing carbon which has at least partly a turbostratic structure and is obtained by pyrolytic carbonization of a precursor for a non-graphitizing carbon with a metal (hereinafter referred to as "carbon alloy C1") may be mentioned.

Among the raw materials used for production of a carbon alloy C1, the precursor for a non-graphitizing carbon may, for example, be furfuryl alcohol, a furan resin, a phenol resin, a polyvinyl chloride, a polyvinyl alcohol or a polyacrylonitrile. Two or more precursors for a non-graphitizing carbon may be used in combination.

Specific examples of the metal are transitional metals of the 3rd to 12th groups of the periodic table. Among them, manganese, iron, cobalt, nickel, copper, and chromium are preferred, and manganese, iron and cobalt are particularly preferred. Two or more metals may be used in combination.

The metal may be used in the form of a elemental metal or a metal compound, preferably in the form of a metal compound, such as a metal salt, a metal oxide, a metal hydroxide, a metal nitride, a metal sulfide, a metal carbide or a metal complex.

As another raw material used for production of a carbon alloy C1, a nitrogen-containing compound and/or a boron-containing compound may be used to produce a nitrogen- and/or boron-doped carbon alloy C1. Doping with nitrogen and/or boron improves the performance of a carbon alloy C1.

The nitrogen-containing compound may, for example, be phthalocyanine, acrylonitrile, ethylenediaminetetraacetic acid or melamine.

The boron-containing compound may, for example, be boron trifluoride methanol complex or boron trifluoride tetrahydrofuran complex.

Pyrolytic carbonization may be carried out, for example, by heating the above-mentioned raw materials at 300 to 1500° C.

As the carbon alloy C1, the electrode catalyst disclosed in JP-A-2003-249231, the electrode catalyst for a fuel cell disclosed in JP-A-2005-019332 or the carbon alloy catalyst disclosed in WO2015/147131 may, for example, be used.

As another example of the carbon alloy, a carbon alloy (hereinafter referred to as "carbon alloy C2") obtained by heating a mixture of a thermosetting resin or a precursor for a thermosetting resin with a nitrogen-containing compound and/or a boron-containing compound, and which contains defects and electron deficiency in its carbon crystal structure responsible for its high oxygen reducing activity in a catalyst layer.

Among the raw materials used for production of a carbon alloy C2, the thermosetting resin or its precursor may, for example, furfuryl alcohol, a furan resin or a phenol resin. Two or more thermosetting resins may be used in combination.

Examples of the nitrogen-containing compound and the boron-containing compound are the same as those mentioned above the raw material for a carbon alloy C1. The nitrogen-containing compound and the boron-containing compound may be a mixture of two or more species.

Pyrolytic carbonization in production of a carbon alloy C2 may be carried out in the same manner as mentioned for pyrolytic carbonization in production of a carbon alloy C1.

As the carbon alloy C2, the carbon alloy fine powder disclosed in JP-A-2004-362802, WO2006/003831 or JP-A-2007-311026 may for example, be used.

As the carbon alloy catalyst, those available from Green Science Alliance Co., Ltd. may, for example, be used.

The carbon alloy catalyst may be supported on a carbon carrier.

The carbon carrier may, for example, be carbon black powder, graphitized carbon, carbon fiber or carbon nanotube.

The carbon alloy catalyst may be loaded onto a carbon carrier, for example, by adding a carbon carrier such as carbon black powder to the raw materials of a nanoshell-containing carbon (NSCC).

The present catalyst layer may further comprise a catalyst other than the carbon alloy catalyst (hereinafter referred to as an "additional catalyst". Such an additional catalyst may be a noble metal catalyst and is preferably a platinum catalyst or a platinum alloy catalyst in view of catalytic activity and stability.

<Polymer (H)>

The polymer (H) is an ion exchange polymer comprising specific cyclic ether units shown below.

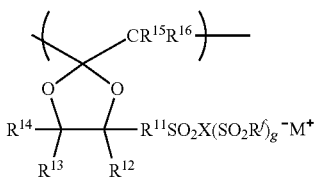
(u11)

In the formula (u11), $R^{11}$ is a bivalent perfluoro organic group which may have an ethereal oxygen atom. The organic group comprises at least one carbon atom. The bivalent perfluoro organic group is preferably a perfluoroalkylene group. The number of ethereal oxygen atoms, if present, in the perfluoroalkylene group may be 1 or at least two. Such an oxygen atom may be inserted between carbon atoms in the perfluoroalkyl group or may be bonded to a terminal carbon atom. The perfluoroalkylene group may be linear or branched, and is preferably linear.

Each of $R^{12}$, $R^{13}$, $R^{15}$ and $R^{16}$ is independently a monovalent perfluoro organic group which may have an ethereal oxygen atom or a fluorine atom. The monovalent perfluoro organic group is preferably a perfluoroalkyl group. It is preferred that at least one of $R^{15}$ and $R^{16}$ is a fluorine atom, and it is more preferred that both are fluorine atoms, in view of polymerizability.

$R^{14}$ is a monovalent perfluoro organic group which may have an ethereal oxygen atom, a fluorine atom or a group represented by $—R^{11}(SO_2X(SO_2R^f)_a)^-M^+$. The monovalent perfluoro organic group is preferably a perfluoroalkyl group. The number of ethereal oxygen atoms, if present, in the perfluoroalkyl group may be 1 or at least two. Such an oxygen atom may be inserted between carbon atoms in the perfluoroalkyl group or may be bonded to a terminal carbon atom. The perfluoroalkyl group may be linear or branched and is preferably linear. When the formula (u11) contains two $R^{11}$'s, they may be identical to or different from each other.

$M^+$ is $H^+$, a monovalent metal cation (such as a potassium ion or a sodium ion) or ammonium ion which may have at least one hydrocarbon group instead of a hydrogen atom and is preferably $H^+$ for high electrical conductivity.

$R^f$ is a linear or branched perfluoroalkyl group which may have an ethereal oxygen atom. The number of carbon atoms in the perfluoroalkyl group is preferably from 1 to 8, particularly preferably from 1 to 6. When two or more $R^f$'s are present, they may be identical to or different from one another.

X is an oxygen atom, a nitrogen atom or a carbon atom, and a is 0 when X is an oxygen atom, a is 1 when X is a nitrogen atom, and a is 2 when X is a carbon atom.

As the $—(SO_2X(SO_2R^f)_a)^-M^+$ group, a sulfonic acid group (a $—SO_3^-M^+$ group), a sulfonimide group (a $—SO_2N(SO_2R^f)^-M^+$ group) or a sulfone methide group (a $—SO_2C(SO_2R^f)_2)^-M^+$ group) may be mentioned specifically.

Units (u11) are preferably units (u11-1).

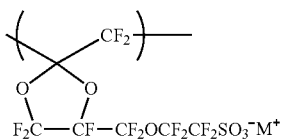
(u11-1)

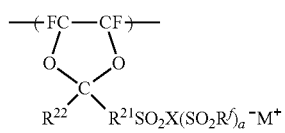
(u12)

In the formula (u12), $R^{21}$ is a $C_{1-6}$ perfluoroalkylene group or a $C_{2-6}$ perfluoroalkylene group which may have an ethereal oxygen atom between carbon atoms. The number of ethereal oxygen atoms, if present, in the perfluoroalkylene group may be 1 or at least two. The perfluoroalkylene group may be linear or branched and is preferably linear.

$R^{22}$ is a fluorine atom, a $C_{1-6}$ perfluoroalkyl group, a $C_{2-6}$ perfluoroalkyl group which may have an ethereal oxygen atom between carbon atoms or a group represented by $—R^{21}(SO_2X(SO_2R^f)_a)^-M^+$. The number of ethereal oxygen atoms, if present, in the perfluoroalkyl group may be 1 or at least two. The perfluoroalkyl group may be linear or branched and is preferably linear. When the formula (u12) contains two $R^{21}$'s, they may be identical to or different from each other.

$M^+$, $R^f$, X and a in the formula (u12) are the same as $M^+$, $R^f$, X and a in the formula (u11), respectively.

As specific examples of units (u12), units (u12-1) and units (u12-2) may be mentioned. In the formula, $M^+$ is the same as $M^+$ in the formula (u11).

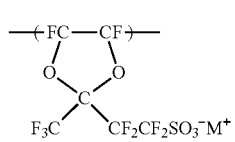
(u12-1)

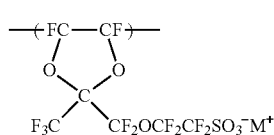
(u12-2)

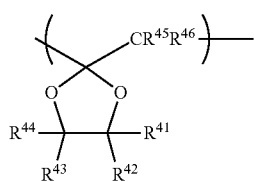
(u21)

In the formula (u21), each of $R^{41}$, $R^{42}$, $R^{43}$, $R^{44}$, $R^{45}$ and $R^{46}$ is independently a monovalent perfluoro organic group which may have an ethereal oxygen atom or a fluorine atom. The monovalent perfluoro organic group is preferably a perfluoroalkyl group. The number of ethereal oxygen atoms, if present, in the perfluoroalkyl group may be 1 or at least two. Such an oxygen atom may be inserted between carbon atoms in the perfluoroalkyl group or may be bonded to a terminal carbon atom. The perfluoroalkyl group may be linear or branched and is preferably linear.

It is preferred that at least one of $R^{45}$ and $R^{46}$ is a fluorine atom, and it is more preferred that both are fluorine atoms, in view of polymerizability.

Units (u21) are preferably units (u21-1).

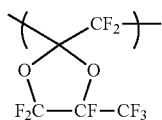
(u21-1)

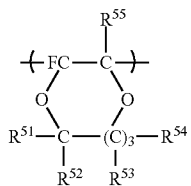
(u22)

In the formula (u22), s is 0 or 1, preferably 0.

Each of $R^{51}$ and $R^{52}$ is independently a fluorine atom or a $C_{1-5}$ perfluoroalkyl group or may form a spiro ring together with each other (when s is 0).

Each of $R^{53}$ and $R^{54}$ is independently a fluorine atom or a $C_{1-5}$ perfluoroalkyl group.

$R^{55}$ is a fluorine atom, a $C_{1-5}$ perfluoroalkyl group or a $C_{1-5}$ perfluoroalkoxy group. $R^{55}$ is preferably a fluorine atom for high polymerizability.

The perfluoroalkyl group and the perfluoroalkoxy group may be linear or branched and are preferably linear.

Units (u22) are preferably units (u22-1).

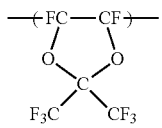
(u22-1)

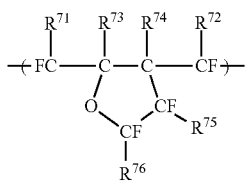
(u24)

In the formula (u24), each of $R^{71}$ to $R^{76}$ is independently a monovalent perfluoro organic group which may have an ethereal oxygen atom or a fluorine atom. The monovalent perfluoro organic group is preferably a perfluoroalkyl group. The number of ethereal oxygen atoms, if present, in the perfluoroalkyl group may be 1 or at least two. Such an oxygen atom may be inserted between carbon atoms in the perfluoroalkyl group or may be bonded to a terminal carbon atom. The perfluoroalkyl group may be linear or branched and is preferably linear.

$R^{71}$ to $R^{74}$ are preferably fluorine atoms for high polymerizability.

The total content of specific cyclic ether units is preferably at least 30 mol %, more preferably at least 40 mol %, particularly preferably at least 65 mol %, relative to all the units constituting the polymer (H), to provide a fuel cell with higher power efficiency.

The upper limit for the total content of specific cyclic ether units is preferably 100 mol %, particularly preferably 80 mol %, relative to all the units constituting the polymer (H).

The polymer (H) may comprise only one species of specific cyclic ether units or two or more species of specific cyclic ether units. In the latter case, the content of such units means the total content of these species.

The polymer (H) may further comprise units based on a perfluoro monomer which do not have a cyclic ether structure and have an ion exchange group. Hereinafter such units are referred to simply as "units based on a perfluoro monomer".

Such units based on a perfluoro monomer may be units (u31) or units (u32) and are preferably units (u32) to provide a fuel cell with higher power efficiency.

(u31)

In the formula, Z is a fluorine atom or a trifluoromethyl group, q is 0 or 1, m is an integer of from 0 to 3, p is 0 or 1, and n is an integer of from 1 to 12, provided that m+p>0.

$M^+$ is the same as $M^+$ in the formula (u11).

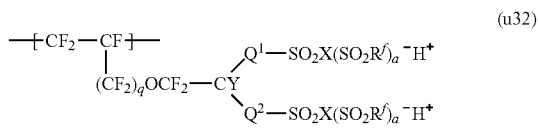
(u32)

$Q^1$ is a perfluoroalkylene group which may have an ethereal oxygen atom.

$Q^2$ is a single bond or a perfluoroalkylene group which may have an ethereal oxygen atom, The number of ethereal oxygen atoms, if present, in the perfluoroalkylene group as $Q^1$ or $Q^2$ may be 1 or at least two. Such an oxygen atom may be inserted between carbon atoms in the perfluoroalkylene group or may be bonded to a terminal carbon atom.

The perfluoroalkylene group may be linear or branched and is preferably linear. The number of carbon atoms in the perfluoroalkylene group is preferably from 1 to 6, particularly preferably from 1 to 4. When the number of carbon atoms is at most 6, a fluoro monomer having a boiling point enough low to be easily obtained by distillation can be used as the starting material. When the number of carbon atoms is at most 6, the polymer (H) has good proton conductivity without sacrifice of ion exchange capacity.

$Q^2$ is preferably a perfluoroalkylene group which may have an ethereal oxygen atom, more preferably a $C_{1-6}$ perfluoroalkylene group which may have an ethereal oxygen atom. When $Q^2$ is a perfluoroalkylene group which may have an ethereal oxygen atom, it is possible to provide a fuel cell which shows stabler power generation performance during a long period of operation, than when $Q^2$ is a single bond.

It is preferred that at least one of $Q^1$ and $Q^2$ is a $C_{1-6}$ perfluoroalkylene group which has an ethereal oxygen atom. A monomer having $C_{1-6}$ perfluoroalkylene group which has an ethereal oxygen atom is easy to obtain in a high yield because it can be synthesized without the necessity for fluorination with a fluorine gas.

Y is a fluorine atom or a monovalent perfluoro organic group. Y is preferably a fluorine atom or a $C_{1-6}$ linear perfluoroalkyl group which may have an ethereal oxygen atom.

q is 0 or 1.

$R^f$, X and a are the same as $R^f$, X and a in the formula (u11), respectively.

Units (u32) are preferably units (u32-1) to (u32-3), particularly units (u32-1), for easy production on an industrial scale.

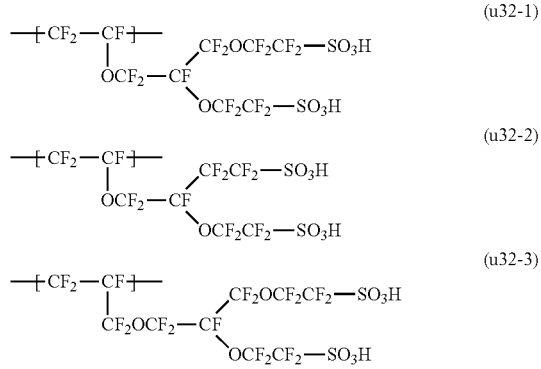

The total content of units based on a perfluoro monomer is preferably from 5 to 40 mol %, more preferably from 10 to 35 mol %, particularly preferably from 15 to 30 mol %, relative to all the units constituting the polymer (H), to provide a fuel cell which strikes a good balance between power output and mechanical strength and shows high performance as a whole.

The polymer (H) may comprise only one species of units based on a perfluoro monomer or two or more species of units based on perfluoro monomers. In the latter case, the content of such units means the total content of these species.

The polymer (H) may further comprise hydrophobic units based on tetrafluoroethylene (TFE) to facilitate water removal from the catalyst layer and thereby make it possible to provide a fuel cell with higher power efficiency.

The content of units based on TFE is preferably from 5 to 40 mol %, more preferably from 5 to 35 mol %, particularly preferably from 5 to 30 mol %.

In addition to the units mentioned above, the polymer (H) may comprise other units based on monomers such as perfluoro(3-butenyl vinyl ether), perfluoro(allyl vinyl ether), perfluoro α-olefins (such as hexafluoropropylene) and perfluoro(alkyl vinyl ethers).

The ion exchange groups in the polymer (H) are preferably groups (g1).

—(SO$_2$X(SO$_2$R$^f$)$_a$)$^-$M$^+$ (g1)

$M^+$, $R^f$, X and a are the same as $M^+$, $R^f$, X and a in the formula (u11), respectively.

The group (g1) may, for example, be a sulfonic acid group (a —SO$_3^-$M$^+$ group), a sulfonimide group (a —SO$_2$N(SO$_2$R$^f$)$^-$M$^+$ group) or a sulfone methide group (a —SO$_2$C(SO$_2$R$^f$)$_2$)$^-$M$^+$ group) and is preferably a sulfonic acid group (a —SO$_3^-$M$^+$ group).

When the specific cyclic ether units in the polymer (H) have an ion change group, the ion exchange polymer (H) does not have to comprise other units having an ion exchange group, and when the specific cyclic ether units in the polymer (H) do not have an ion change group, the ion exchange polymer (H) has to comprise units having an ion exchange group such as those based on a perfluoro monomer.

It is preferred that the polymer (H) comprises units (u22) to provide a fuel cell with high power efficiency.

It is more preferred that the polymer (H) comprises units (u22) and units (u32) provide a fuel cell with higher power efficiency.

The content of the polymer (H) in the catalyst layer is preferably from 40 to 200 parts by mass, more preferably from 60 to 140 parts by mass, particularly preferably from 75 to 100 parts by mass, relative to 100 parts by mass of the carbon alloy catalyst. When the content of the polymer (H) is within the above-mentioned range, it is possible to provide a fuel cell with higher power efficiency.

When the catalyst layer comprises an additional catalyst, the content of the polymer (H) is based on the amount of the carbon alloy catalyst only, not on the total amount of the carbon alloy catalyst and the additional catalyst.

(Physical Properties)

The ion exchange capacity of the polymer (H) is preferably from 1.1 to 2.8 meq/g dry resin, more preferably from 1.2 to 2.8 meq/g dry resin, further preferably from 1.3 to 2.3 meq/g dry resin, particularly preferably from 1.3 to 2.0 meq/g dry resin. When the exchange capacity is at least 1.1 meq/g dry resin, the polymer (H) has high electrical conductivity and can form a catalyst layer which can achieve a sufficient power output when used in a fuel cell. When the ion exchange capacity is at most 2.8 meq/g dry resin, the polymer is easy to synthesize.

The TQ value of the polymer (H) is preferably from 200 to 330° C. The lower limit of the TQ value is more preferably 210° C. to prevent the electrode from cracking. The upper limit is more preferably 310° C., particularly preferably 300° C. or below to prevent thermal decomposition of the polymer (H). When the TO value is within the above-mentioned range, the polymer (H) has good heat resistance.

(Production of Polymer (H))

The polymer (H) may be produced, for example, by polymerizing a specific cyclic monomer with at least one of an optional perfluoro monomer and tetrafluoroethylene and converting the precursor groups for ion exchange groups in the resulting polymer (F) to ion exchange groups.

Each monomer which may be used for production of the polymer (H) will be described below.

Units (u11) are derived from a monomer (m11) by polymerization, preferred examples of the monomer (m11) are monomers (m11-1) to (m11-4). The monomer (m11) may be synthesized by a known method.

In the formula (m11), $R^{11}$ to $R^{16}$ are the same as $R^{11}$ to $R^{16}$ in the formula (u11), respectively.

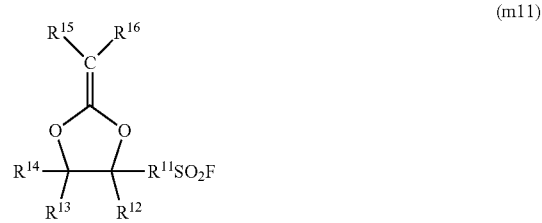

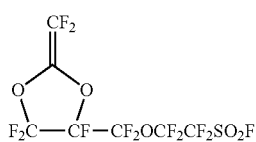 (m11-1)

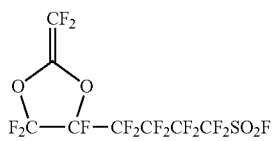 (m11-2)

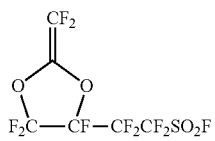 (m11-3)

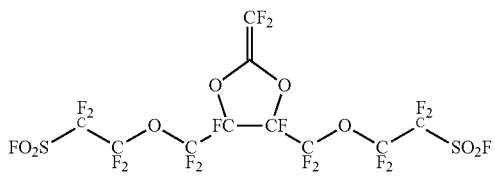 (m11-4)

Units (u12) are derived from a monomer (m12) by polymerization, and preferred examples of the monomer (m12) are monomers (m12-1) and (m12-2). The monomer (m12) may be synthesized by a known method.

In the formula (m12), $R^{21}$ and $R^{22}$ are the same as $R^{21}$ and $R^{22}$ in the formula (u12), respectively.

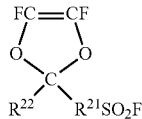 (m12)

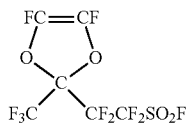 (m12-1)

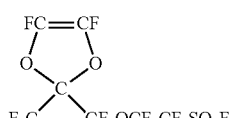 (m12-2)

Units (u21) are derived from a monomer (m21) by polymerization, and preferred examples of the monomer (m21) are monomers (m21-1) and (m21-2). The monomer (m21) may be synthesized by a known method.

In the formula (m21), $R^{41}$ to $R^{46}$ are the same as $R^{41}$ to $R^{46}$ in the formula (u21), respectively.

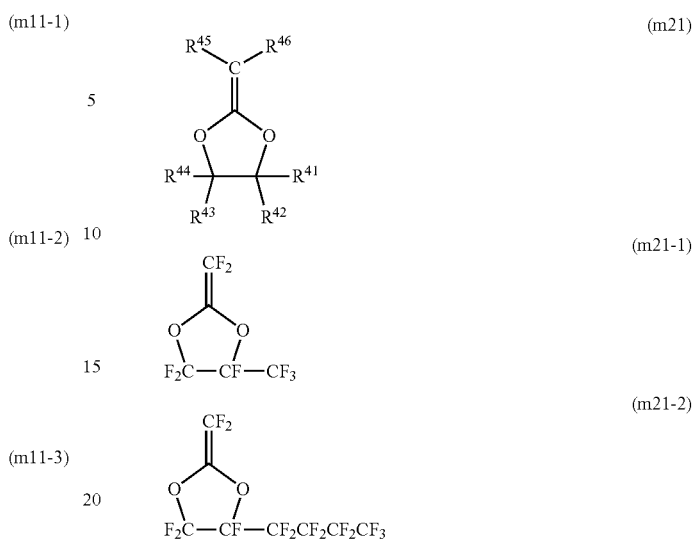

Units (u22) are derived from a monomer (m22) by polymerization, and preferred examples of the monomer (m22) are monomers (m22-1) to (m22-11). The monomer (m22) may be synthesized by a known method.

In the formula (m22), $R^{51}$ to $R^{55}$ and s are the same as $R^{51}$ to $R^{55}$ and s in the formula (u22), respectively.

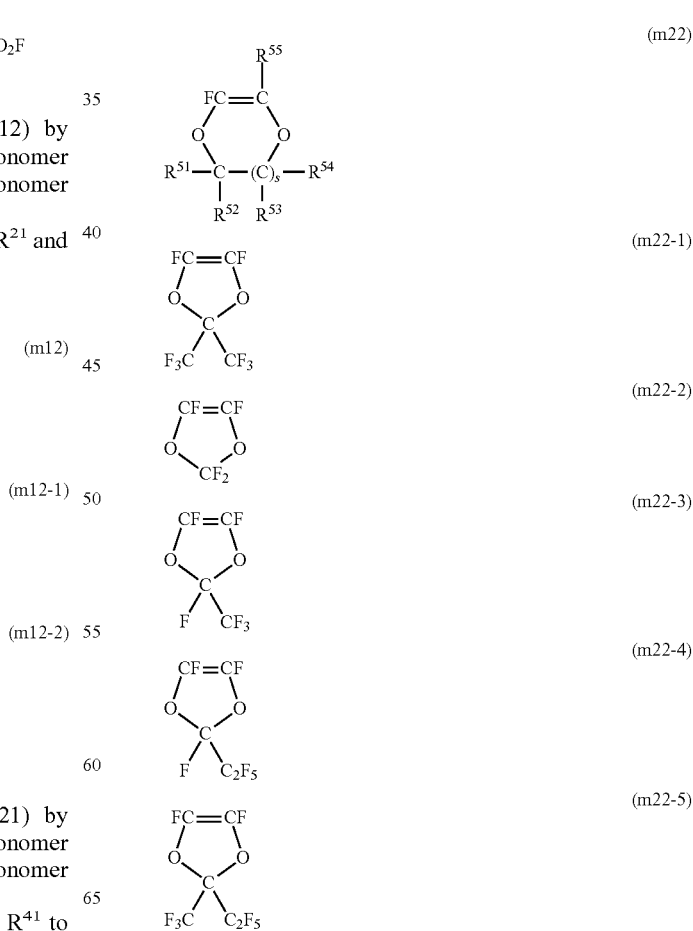

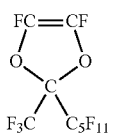 (m22-6)

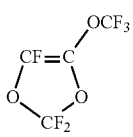 (m22-7)

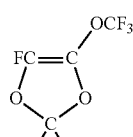 (m22-8)

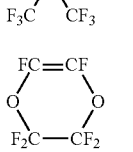 (m22-9)

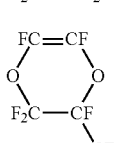 (m22-10)

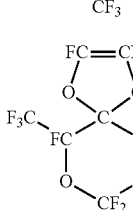 (m22-11)

Units (u24) are derived from a monomer (m24) by cyclization polymerization, and as the monomer (m24), monomers (m24-1) to (m24-3) may be mentioned preferably. The monomer (m24) may be synthesized by a known method.

In formula (m24), $R^{71}$ to $R^{76}$ are the same as $R^{71}$ to $R^{76}$ in the formula (u24), respectively.

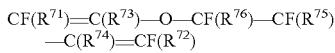 (m24)

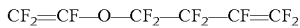 (m24-1)

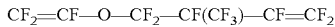 (m24-2)

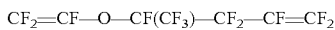 (m24-3)

For production of the polymer (H), a perfluoro monomer which does not contain a cyclic ether structure and has a precursor group for an ion exchange group may be used.

As the perfluoro monomer, a monomer (m31) and a monomer (m32) may be mentioned, and a monomer (m32) is preferred in order to provide a fuel cell with higher power efficiency.

 (m31)

The monomer (m31) corresponds to units (u31).

Z, q, m, p and n in the monomer (m31) are the same as Z, q, p and n in the formula (u31), respectively.

As the monomer (m31), monomers (m31-1) to (m31-4) may be mentioned preferably.

 (m31-1)

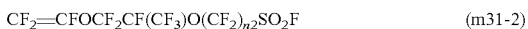 (m31-2)

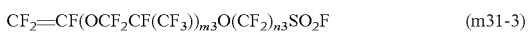 (m31-3)

 (m31-4)

n1, n2, n3 and n4 are integers of from 1 to 8, and m3 is an integer of from 1 to 3.

The monomer (m31) may be synthesized, for example, in accordance with Prog. Polym. Sci., vol. 12, 1986, p. 233-237 or U.S. Pat. No. 4,330,654.

 (m32)

$Q^1$, $Q^2$, Y and q in the monomer (m32) are the same as $Q^1$, $Q^2$, Y and q in the formula (u32), respectively.

The monomer (m32) corresponds to units (u32).

As the monomer (m32), monomers (m32-1) to (m32-3) are preferred for easy production of the polymer (H) on an industrial scale, and a monomer (m32-1) is particularly preferred.

 (m32-1)

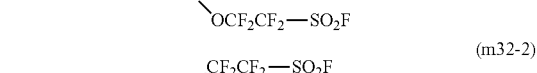 (m32-2)

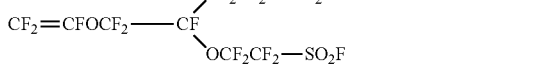 (m32-3)

The monomer (m32) may be synthesized, for example, in accordance with WO2007/013533 or JP-A-2008-202039.

Tetrafluoroethylene may be used for production of the polymer (H).

For production of the polymer (H), in addition to the above-mentioned monomers, other monomers such as perfluoro(3-butenyl vinyl ether), perfluoro(allyl vinyl ether), perfluoro α-olefins (such as hexafluoropropylene), perfluoro (alkyl vinyl ethers).

How to convert precursor groups (—$SO_2F$) for ion exchange groups to ion exchange groups will be described below.

The following method (i) is available for conversion of groups represented by —$SO_2F$ to sulfonic acid groups (—$SO_3^-H^+$), and the following method (ii) is available for conversion of groups represented by —$SO_2F$ to sulfonimide groups (—$SO_2N(SO_2R^f)^-H^+$).

(i) A method comprising hydrolysis of groups represented by —$SO_2F$ into salt-form sulfonic acid groups and acidification to acid-form sulfonic acid groups.

(ii) A method comprising imidation of groups represented by —$SO_2F$ into salt-form sulfonimide groups and acidification to acid-form sulfonimide groups.

Method (i):

The hydrolysis is carried out, for example, by bringing a polymer having precursor groups for ion exchange groups with a basic compound in a solvent. As the basic compound, sodium hydroxide, potassium hydroxide or the like may be mentioned. As the solvent, water, a solvent mixture of water and a polar solvent or the like may be mentioned. As the polar solvent, an alcohol (such as methanol or ethanol), dimethyl sulfoxide or the like may be mentioned.

The acidification is carried out, for example, by bringing the polymer having salt-form sulfonic acid groups into contact with an aqueous solution of hydrochloric acid, sulfuric acid or the like. The hydrolysis and the acidification are usually carried out at 0 to 120° C.

Method (ii): For the imidation, the following methods may be mentioned.

(ii-1) A method comprising reacting groups represented by —$SO_2F$ with $R^fSO_2NHM$.

(ii-2) A method comprising reacting groups represented by —$SO_2F$ with $R^fSO_2NH_2$ in the presence of an alkali metal hydroxide, an alkali metal carbonate, MF, ammonia or a primary to tertiary amine.

(ii-3) A method comprising reacting groups represented by —$SO_2F$ with $R^fSO_2NMSi(CH_3)_3$.

M is an alkali metal or a primary to quaternary ammonium.

The acidification is carried out by treating a polymer having salt-form sulfonimide groups with an acid (such as sulfuric acid, nitric acid or hydrochloric acid).

When the ion exchange groups are sulfonimide groups, the polymer (H) may also be produced by polymerizing a monomer having a sulfonimide group derived from a monomer (m11), (m12), (m31) or (m32) by converting a group represented by —$SO_2F$ to a sulfonimide group with a monomer (m21) or a monomer (m22).

The monomer having a sulfonimide group instead of a group represented by —$SO_2F$ may be obtained by addition of chlorine or bromine to the carbon-carbon double bond in a monomer (m11), (m12), (m31) or (m32), conversion of group represented by —$SO_2F$ by the method (ii) and dichlorination or debromination with metallic zinc.

<Application>

The present catalyst layer is suitably used as a catalyst layer in the after-mentioned membrane-electrode assembly.

[Catalyst Layer Ink]

The catalyst layer ink of the present invention (hereinafter referred to as "the present catalyst layer ink") comprises a carbon alloy catalyst, an ion exchange polymer (polymer (H)) comprising specific cyclic ether units, and a solvent.

The carbon alloy catalyst and the polymer (H) in the present catalyst layer ink are the same as those in the above-mentioned present catalyst layer and will not be described anymore.

The present catalyst layer ink can form the present catalyst layer. For formation of a catalyst layer from the present catalyst layer ink, conventional methods may be used.

The solvent may be water or an organic solvent and may be even a mixture thereof.

The organic solvent may, for example, be methanol, ethanol, 1-propanol, 2-propanol, 1-butanol, 2-methyl-1-propanol, 2-butanol, 2-methyl-2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3-hexafluoro-2-propanol, 3,3,3-trifluoro-1-propanol, 3,3,4,4,5,5,6,6,6-nonafluoro-1-hexanol or 3,3,4,4,5,5,6,67,7,8,8,8-tridecafluoro-1-octanol. The organic solvent may be a single species or a combination of two or more species.

The solid content of the present catalyst layer ink is preferably from 15 to 45 mass %, more preferably from 20 to 35 mass %, particularly preferably from 20 to 30 mass %, relative to the total mass of the present catalyst layer ink.

The solid content of the present catalyst layer ink means the part of the present catalyst layer ink other than the solvent.

[Membrane-Electrode Assembly]

The membrane-electrode assembly of the present invention comprises an anode having a catalyst layer, a cathode having a catalyst layer and a polymer electrolyte membrane sandwiched between the anode and the cathode, wherein at least one of the catalyst layer in the anode and the catalyst layer in the cathode is the present catalyst layer.

The membrane-electrode assembly is suitably used for a polymer electrolyte fuel cell.

The membrane-electrode assembly of the present invention having the present catalyst layer can provide a fuel cell with high power efficiency.

FIG. 1 is a schematic cross-sectional view of an example of the membrane-electrode assembly of the present invention. The membrane-electrode assembly 10 comprises an anode 13 having a catalyst layer 11 and a gas diffusion layer 12, a cathode 14 having a catalyst layer 11 and a gas diffusion layer 12, and a polymer electrolyte membrane 15 sandwiched between the anode 13 and the cathode 14, in contact with the catalyst layers 11.

At least one of the catalyst layer 11 in the anode 13 and the catalyst layer 11 in the cathode 14 is the present catalyst layer, and both of them may be the present catalyst layers. When the either catalyst layer 11 is the present catalyst layer, and the other catalyst layer 11 is a catalyst layer other than the present catalyst layer, the catalyst layer other than the present catalyst layer may be any conventional catalyst layer.

For formation of the catalyst layer 11, the following methods may be mentioned.

(i) A method comprising applying a catalyst layer ink onto the polymer electrolyte membrane 15, the gas diffusion layer 12 or the after-mentioned carbon layer (not shown) and drying it.

(ii) A method comprising applying a catalyst layer ink onto a base film and drying it to form a catalyst layer 11, and then transferring the catalyst layer 11 onto a polymer electrolyte membrane 15.

The gas diffusion layers 12 have a function to uniformly diffuse gas through the catalyst layers and a function as current collectors.

The gas diffusion layers 12 may, for example, be carbon paper, carbon cloth or carbon felt. The gas diffusion layers 12 preferably have a water-repellent finish of polytetrafluoroethylene or the like.

Although the membrane-electrode assembly 10 shown in FIG. 1 comprises gas diffusion layers 12, gas diffusion layers are optional, and hence the membrane-electrode assembly may comprise no gas diffusion layers.

The polymer electrolyte membrane 15 comprises an ion exchange polymer.

The ion exchange polymer may be the polymer (H) or a conventional ion exchange polymer. As conventional ion exchange polymers, a polymer obtained from a polymer comprising units based on a monomer (m31) and units based on tetrafluoroethylene by conversion of groups represented by —$SO_2F$ to sulfonic acid groups, a polymer from a polymer comprising units based on a monomer (m32) and units based on tetrafluoroethylene by conversion of groups represented by —SO$_2$F to sulfonic acid groups and the like may be mentioned.

The polymer electrolyte membrane 15 may be formed, for example, by applying a liquid composition comprising such a polymer onto a base film or a catalyst layer 11 and drying it (casting).

The liquid composition is a dispersion of such a polymer in a solvent which comprises either an organic solvent or water or both of them.

It is preferred to treat the polymer electrolyte membrane 15 with heat to stabilize it. The heat treatment temperature is preferably from 130 to 200° C., although it depends on the kind of the polymer.

The polymer electrolyte membrane 15 may be treated with an aqueous hydrogen peroxide solution, if necessary.

The polymer electrolyte membrane 15 may be reinforced with a reinforcing material such as a porous body, fibers, a woven fabric or a non-woven fabric. The reinforcing material may be made of polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide or the like.

The polymer electrolyte membrane 15 may further comprise atoms of at least one member selected from the group consisting of cerium and manganese to further improve on durability. Cerium and manganese decompose hydrogen peroxide responsible for deterioration of the polymer electrolyte membrane 15. Cerium and manganese in the polymer electrolyte membrane 15 are preferably in the form of ions in any state.

The polymer electrolyte membrane 15 may comprise silica or a heteropoly acid (such as zirconium phosphate, phosphomolybdic acid or phosphotungstic acid) as a humectant.

The membrane-electrode assembly 10 may be produced, for example, as follows.

(i) By forming catalyst layers 11 on the polymer electrolyte membrane 15 and sandwiching the resulting membrane-catalyst layer assembly between gas diffusion layers 12; or (ii) By forming catalyst layers 11 on gas diffusion layers 12 to form electrodes (an anode 13 and a cathode 14) and sandwiching a polymer electrolyte membrane 15 between the electrodes.

The membrane-electrode assembly 10 may comprise carbon layers (not shown) between the catalyst layers 11 and the gas diffusion layers 12. Carbon layers facilitate diffusion of gas to the surfaces of the catalyst layers 11 and improve the power efficiency of the fuel cell.

The carbon layers contain, for example, carbon and a nonionic fluoropolymer. A preferred example of the carbon is a carbon nanofiber having a diameter of from 1 to 1,000 nm and a fiber length of at most 1,000 µm. The nonionic fluoropolymer may, for example, be polytetrafluoroethylene.

EXAMPLES

Now, the present invention will be described in further detail with reference to Examples. It should be understood that the present invention is by no means restricted thereto. Examples 1 to 11 are preparation examples, Examples 12 to 21 are working Examples, and Example 22 is a comparative example.

[Ion Exchange Capacity]

The ion exchange capacity of a polymer (H) (hydrolyzed polymer) was determined as follows.

The polymer (H) was dried under a stream of dry nitrogen in a glove box for 24 hours or longer, and the dry mass of the polymer (H) was measured in the glove box.

Then, the polymer (H) was soaked in 2 mol/L aqueous sodium chloride at 60° C. for 1 hour and cooled to room temperature. The aqueous sodium chloride in which the polymer (H) had been soaked The ion exchange capacity of the polymer (H) was titrated with 0.5 mol/L aqueous sodium hydroxide to determine the ion exchange capacity of the polymer (H).

[TQ Value]

By means of a flow tester (CFT-500D, manufactured by Shimadzu Corporation) equipped with a nozzle having an inner diameter of 1 mm and a length of 1 mm, a polymer (H) was melt-extruded at a pressure of 2.94 MPa (gauge pressure), and the flow rates of the polymer (H) were measured at various temperatures to determine the TQ value, which is defined as the temperature at which Q value is 100 mm$^3$/second.

[Synthesis of Monomer (m11-1)]

Monomer (m11-1) was synthesized in accordance with Examples on pages 37-42 of WO2003/037885.

[Synthesis of Monomer (m12-1)]

Monomer (m12-1) was synthesized in accordance with Example 1 in JP-A-2006-152249.

[Synthesis of Monomer (m31-4)]

Monomer (m31-4) was synthesized by a conventional method.

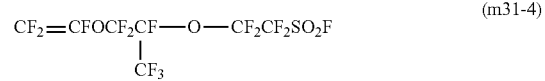

[Synthesis of Monomer (m31-5)]

Monomer (m31-5) was synthesized by a conventional method.

[Synthesis of Monomer (m32-1)]

Monomer (m32-1) was synthesized in accordance with example 1 in JP-A-2008-202039.

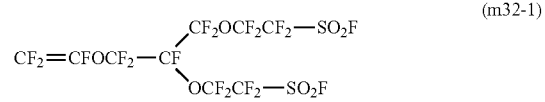

[Synthesis of Monomer (m21-1)]

Monomer (m21-1) was synthesized by a conventional method.

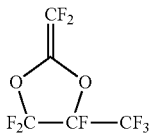
(m21-1)

[Synthesis of Monomer (m22-1)]

Monomer (m22-1) was synthesized by a conventional method.

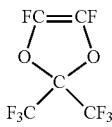
(m22-1)

[Synthesis of Monomer (m24-1)]

Monomer (m24-1) was synthesized by a conventional method.

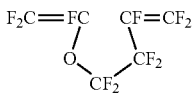
(m24-1)

[Radical Polymerization Initiators]

The following compounds (i-1) to (i-3) were used as radical polymerization initiators.

<Compound (i-1)>

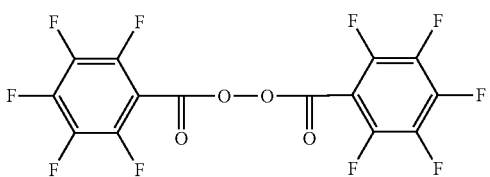
(i-1)

<Compound (i-2)>

$((CH_3)_2CHOCOO)_2$ (i-2)

<Compound (i-3)>

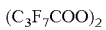
$(C_3F_7COO)_2$ (i-3)

[Solvents]

The following compounds (s-1) and (s-2) were used as solvents.

<Compound (s-1)>

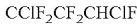
$CClF_2CF_2CHClF$ (s-1)

<Compound (s-2)>

$CH_3CCl_2F$ (s-2)

[Preparation of Mixture Containing Carbon Alloy Catalyst]

Mixture A of a carbon alloy catalyst designated as Sample 1 in Experiment 2 in WO2015/147131 and carbon black was prepared.

Example 1: Preparation Example 9.15 g of monomer (m22-1), 45.65 g of monomer (m32-1) and 6.4 mg of compound (i-2) were put in a 125 mL stainless steel autoclave and cooled with liquid nitrogen and degassed sufficiently. Then, the temperature was raised and maintained at 40° C. for 24.5 hours, and the autoclave was cooled to terminate the reaction.

The reaction product was diluted with compound (s-1) and aggregated by addition of n-hexane, and the polymer was collected by filtration. The polymer was stirred with compound (s-1), aggregated again by addition of n-hexane and dried at 80° C. overnight to obtain polymer (F-1). The yield was 4.5 g.

Polymer (F-1) was soaked in an aqueous solution containing 20 mass % methanol and 15 mass % potassium hydroxide at 50° C. for 40 hours to hydrolyze —$SO_2F$ groups in polymer (F-1) to —$SO_3K$ groups. Then, the polymer was soaked in 3 mol/L aqueous hydrogen chloride at room temperature for 2 hours. The same treatment was repeated 4 more times with renewal of the aqueous hydrochloric acid to obtain polymer (H-1) having sulfonic acid groups converted from —$SO_3K$ groups. Polymer (H-1) was washed with ultrapure water sufficiently. The ion exchange capacity of polymer (H-1) was measured. The results are shown in Table 1.

Polymer (H-1) was mixed with a solvent mixture of ethanol and water (ethanol/water mass ratio=60/40) so that the solid content would be 15 mass %, and the resulting mixture was stirred in an autoclave at 105° C. for 8 hours to obtain a dispersion of polymer (H-1) in the dispersion medium, which was designated as liquid composition (D-1).

Example 2: Preparation Example 32.4 g of monomer (m22-1), 166.70 g of monomer (m32-1) and 101 mg of compound (i-2) were put in a 230 mL stainless steel autoclave and cooled with liquid nitrogen and degassed sufficiently. 3.87 g of tetrafluoroethylene (TFE) was fed, and the temperature was raised to 24° C., and after 24 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-2). The yield was 45.9 g.

From polymer (F-2), polymer (H-2) was obtained in the same manner as in Example 1. The ion exchange capacity of polymer (H-2) was measured. The results are shown in Table 1.

Using polymer (H-2), liquid composition (D-2) was obtained in the same manner as in Example 1.

Example 3: Preparation Example 37.45 g of monomer (m22-1), 120.20 g of monomer (m32-1) and 25.2 mg of compound (i-2) were put in a 230 mL stainless steel autoclave and cooled with liquid nitrogen and degassed sufficiently. 4.39 g of TFE was fed, and the temperature was raised to 24° C., and after 12.5 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-3). The yield was 29.6 g.

From polymer (F-3), polymer (H-3) was obtained in the same manner as in Example 1. The ion exchange capacity of polymer (H-3) was measured. The results are shown in Table 1.

Using polymer (H-3), liquid composition (D-3) was obtained in the same manner as in Example 1.

Example 4: Preparation Example 8.50 g of monomer (m22-1), 59.5 g of monomer (m31-4) and 20.4 mg of compound (i-2) were put int a 125 mL stainless steel autoclave and cooled with liquid nitrogen and degassed sufficiently. 2.5 g of TFE was fed, and the temperature was raised to 24° C., and after 24 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-4). The yield was 11.1 g.

From polymer (F-4), polymer (H-4) was obtained in the same manner as in Example 1. The ion exchange capacity of polymer (H-4) was measured. The results are shown in Table 1.

Using polymer (H-4), liquid composition (D-4) was obtained in the same manner as in Example 1.

Example 5: Preparation Example 9.80 g of monomer (m22-1), 37.4 g of monomer (m31-5) and 14.1 mg of compound (i-2) were put in a 125 mL stainless steel autoclave and cooled with liquid nitrogen and degassed sufficiently. 2.5 g of tetrafluoroethylene (TFE) was fed, and the temperature was raised to 24° C., and after 24 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-5). The yield was 10.5 g.

From polymer (F-5), polymer (H-5) was obtained in the same manner as in Example 1. The ion exchange capacity of polymer (H-5) was measured. The results are shown in Table 1.

Using polymer (H-5), liquid composition (D-5) was obtained in the same manner as in Example 1.

Example 6: Preparation Example 3.5 g of monomer (m21-1), 76.33 g of monomer (m32-1) and 8.5 mg of compound (i-2) were put in a 125 mL stainless steel autoclave and cooled with liquid nitrogen and degassed sufficiently. The temperature was raised to 24° C., and after 24 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-6). The yield was 6.4 g. The density of polymer (F-6) was measured. The results are shown in Table 1.

From polymer (F-6), polymer (H-6) was obtained in the same manner as in Example 1. The ion exchange capacity of polymer (H-6) was measured. The results are shown in Table 1.

Example 7: Preparation Example 5.97 g of monomer (m11-1), 13.70 g of monomer (m22-1), 13.75 g of compound (s-1) and 17.1 mg of compound (i-1) were put in a 125 mL stainless steel autoclave and cooled with liquid nitrogen and degassed sufficiently. Then, the temperature was raised to 65° C. and maintained at 65° C. for 6 hours, and the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-7). The yield was 3.7 g.

From polymer (F-7), polymer (H-7) was obtained in the same manner as in Example 1. The ion exchange capacity of polymer (H-7) was measured. The results are shown in Table 1.

Polymer (H-7) was mixed with a solvent mixture of ethanol and water (ethanol/water mass ratio=60/40) so that the solid content would be 15 mass %, and the resulting mixture was stirred in an autoclave at 105° C. for 8 hours to obtain a dispersion of polymer (H-7) in the dispersion medium, which was designated as liquid composition (D-7).

Example 8: Preparation Example 15.0 g of monomer (m22-1), 15.29 g of monomer (m12-1), 10.0 g of compound (s-1) and 23 mg of compound (i-1) were put in a 125 mL stainless steel autoclave and cooled with liquid nitrogen and degassed sufficiently. Then, the temperature was raised to 65° C., and after 18 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-8). The yield was 12.0 g.

From polymer (F-8), polymer (H-8) was obtained in the same manner as in Example 1. The ion exchange capacity of polymer (H-8) was measured. The results are shown in Table 1.

Using polymer (H-8), liquid composition (D-8) was obtained in the same manner as in Example 1.

Example 9: Preparation Example 21.2 g of monomer (m11-1), 170 g of compound (s-1) and 9.5 mg of compound (i-2) were put in a 230 mL stainless steel autoclave and cooled with liquid nitrogen and degassed sufficiently. 20 g of TFE was fed, and the temperature was raised to 40° C., and after 7 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-9). The yield was 11.5 g.

From polymer (F-9), polymer (H-9) and liquid composition (D-9) were obtained in the same manner as in Example 1. The ion exchange capacity of polymer (H-9) was measured. The results are shown in Table 1.

Example 10: Preparation Example 41.7 g of monomer (m24-1), 31.3 g of monomer (m32-1) and 25.0 mg of a 3.2 mass % solution of compound (i-3) in compound (s-1) were put in a 125 mL stainless steel autoclave and cooled with liquid nitrogen and degassed sufficiently. Then, the temperature was raised to 20° C., and after 20 hours of stirring, the autoclave was cooled to terminate the reaction.

The product was diluted with compound (s-1) and aggregated by addition of n-hexane, and the polymer was collected by filtration. Then, the polymer was stirred with compound (s-1), aggregated again by addition of n-hexane and dried at 80° C. overnight to obtain polymer (F-10). The yield was 5.9 g.

From polymer (F-10), polymer (H-10) and liquid composition (D-10) were obtained in the same manner as in Example 1. The ion exchange capacity of polymer (H-10) was measured. The results are shown in Table 1.

Example 11: Preparation Example 49.64 g of monomer (m31-4), 28.22 g of compound (s-1) and 38.9 mg of a 3.2 mass% solution of compound (i-3) in compound (s-1) were put in a 125 mL stainless steel autoclave and cooled with liquid nitrogen and degassed sufficiently. Then, the temperature was raised to 30° C., and TFE was introduced into the system, while the pressure was maintained at 0.37 MPaG, After 4.8 hours of stirring, the autoclave was cooled to terminate the reaction.

The product was diluted with compound (s-1) and aggregated by addition of compound (s-2), and the polymer was collected by filtration. Then, the polymer was stirred with compound (s-1), aggregated again by addition of compound (s-2) and dried at 80° C. overnight to obtain polymer (F-11). The yield was 15.0 g. From polymer (F-11), polymer (H-11) and liquid composition (D-11) were obtained in the same manner as in Example 1. The ion exchange capacity of polymer (H-2) was measured. The results are shown in Table 1.

In Table 1, "total content of specific cyclic ether units" means the sum (mol %) of the contents of units (u11), units (u12), units (u21), units (u22) and units (u24) relative to all the units in a hydrolyzed polymer.

TABLE 1

| | Species of monomers | | | Total content of specific cyclic ester units (mol %) | Polymer Before hydrolysis | After hydrolysis Species | After hydrolysis TQ value (° C.) | Liquid composition | Ion exchange capacity of hydrolyzed polymer meq/g dry resin |
|---|---|---|---|---|---|---|---|---|---|
| Ex. 1 | m22-1 | m32-1 | — | 78 | F-1 | H-1 | 250 | D-1 | 1.34 |
| Ex. 2 | m22-1 | m32-1 | TFE | 67 | F-2 | H-2 | 245 | D-2 | 1.49 |
| Ex. 3 | m22-1 | m32-1 | TFE | 75 | F-3 | H-3 | 280 | D-3 | 1.10 |
| Ex. 4 | m22-1 | m31-4 | TFE | 43 | F-4 | H-4 | 220 | D-4 | 1.15 |
| Ex. 5 | m22-1 | m31-5 | TFE | 50 | F-5 | H-5 | 270 | D-5 | 1.15 |
| Ex. 6 | m21-1 | m32-1 | — | 78 | F-6 | H-6 | 210 | D-6 | 1.35 |
| Ex. 7 | m22-1 | m11-1 | — | 100 | F-7 | H-7 | 235 | D-7 | 1.68 |
| Ex. 8 | m22-1 | m12-1 | — | 100 | F-8 | H-8 | 295 | D-8 | 1.41 |
| Ex. 9 | m11-1 | TFE | — | 38.5 | F-9 | H-9 | 280 | D-9 | 1.71 |
| Ex. 10 | m24-1 | m32-1 | — | 74 | F-10 | H-10 | 200 | D-10 | 1.41 |
| Ex. 11 | m31-4 | TFE | — | 0 | F-11 | H-11 | 220 | D-11 | 1.10 |

Example 12

67 g of liquid composition (D-1) was poured into a mixture of 42 g of water and 36 g of ethanol, and while the resulting mixture was stirred with a stirrer, under cooling with a chiller or the like when too much heat was generated during the stirring, mixture A was added in an amount of 20 g in terms of the carbon alloy catalyst to obtain a catalyst layer ink having a solid content of 22 mass %. The catalyst layer ink was applied onto a sheet of an ethylene-TFE copolymer (product name: AFLEX 100N, manufactured by AGC Inc., thickness 100 μm) (hereinafter referred to as an ETFE sheet) and dried at 80° C. for 30 minutes and treated with heat at 160° C. for 30 minutes to form a catalyst layer.

Liquid composition (D-11) was applied onto an ETFE sheet with a die coater, dried at 80° C. for 30 minutes and then treated with heat at 190° C. for 30 minutes to form a polymer electrolyte membrane having a thickness of 17 μm.

The ETFE sheet was peeled off the polymer electrolyte membrane, and the polymer electrolyte membrane was sandwiched by two catalyst layers with ETFE sheets on them and hot-pressed at 160° C. under 3 MPa for 5 minutes to bond the catalyst layers to both sides of the polymer electrolyte membrane. The ETFE sheets were peeled off to obtain a membrane-catalyst layer assembly having an electrode area of 25 cm$^2$.

Examples 13 to 22

The procedure in Example 12 was followed except that liquid compositions (D-2) to (D-11) were used instead of liquid composition (D-1) for formation of catalyst layers, to obtain membrane-electrode assemblies.

Evaluation Test

<Power Efficiency>

Each membrane-electrode assembly was mounted in a power generation cell, and the powder efficiency was evaluated as follows.

Hydrogen gas (utilization rate 70%) and air (utilization rate 50%) were fed to the anode and the cathode, respectively, at a pressure of 150 kPa (absolute pressure), while the electrode-membrane assembly was kept at a temperature of 80° C. The cell voltage at hydrogen and air humidities of 100% RH at a current density of 0.5 A/cm² was recorded.

The cell voltage was expressed by an index number defined so that the cell voltage of a cell with the membrane-electrode assembly of Example 22 at 0.5 A/cm² is 1.0. The greater the index, the higher the power efficiency. The results are shown in Table 2.

TABLE 2

|  | Liquid composition used as catalyst layer ink | Power efficiency |
| --- | --- | --- |
| Ex. 12 | D-1 | 1.5 |
| Ex. 13 | D-2 | 1.5 |
| Ex. 14 | D-3 | 1.5 |
| Ex. 15 | D-4 | 1.4 |
| Ex. 16 | D-5 | 1.4 |
| Ex. 17 | D-6 | 1.2 |
| Ex. 18 | D-7 | 1.4 |
| Ex. 19 | D-8 | 1.4 |
| Ex. 20 | D-9 | 1.2 |
| Ex. 21 | D-10 | 1.2 |
| Ex. 22 | D-11 | 1.0 |

As shown in Table 2, when catalyst layers comprise a carbon alloy catalyst and ion exchange polymers comprising specific cyclic ether units (as in Examples 12 to 21), fuel cells with high power efficiency were obtained.

This application is a continuation of PCT Application No. PCT/JP2020/048482, filed on Dec. 24, 2020, which is based upon and claims the benefit of priority from Japanese Patent Application No. 2019-237794 filed on Dec. 27, 2019. The contents of those applications are incorporated herein by reference in their entireties.

REFERENCE SYMBOLS 10 membrane-electrode assembly
11 catalyst layer
12 gas diffusion layer
13 anode
14 cathode
15 polymer electrolyte membrane

What is claimed is:

1. A catalyst layer comprising a carbon alloy catalyst and an ion exchange polymer which comprises at least one species of units having a cyclic ether structure selected from the group consisting of units represented by the formula (u11), units represented by the formula (u12), units represented by the formula (u21), units represented by the formula (u22) and units represented by the formula (u24):

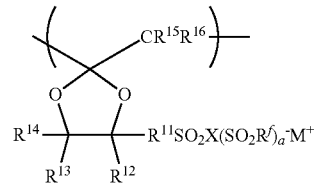 (u11)

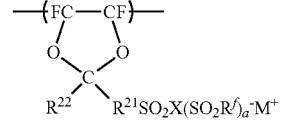 (u12)

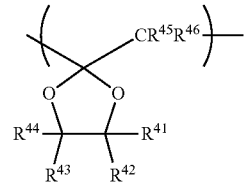 (u21)

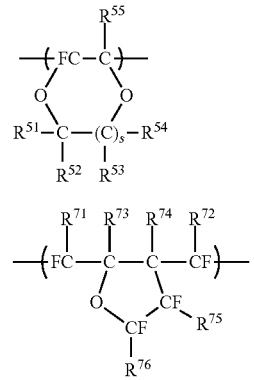 (u22)

(u24)

wherein in the formula (u11), $R^{11}$ is a bivalent perfluoro organic group which may have an ethereal oxygen atom, each of $R^{12}$, $R^{13}$, $R^{15}$ and $R^{16}$ is independently a monovalent perfluoro organic group which may have an ethereal oxygen atom or a fluorine atom, and $R^{14}$ is a monovalent perfluoro organic group which may have an ethereal oxygen atom, a fluorine atom or a group represented by $-R^{11}(SO_2X(SO_2R^f)a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom, in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by $-R^{21}(SO_2X(SO_2R^f)a)^-M^+$ wherein $M^+$, $R^f$, X and a are the same as defined above, in the formula (u21), each of $R^{41}$, $R^{42}$, $R^{43}$, $R^{44}$, $R^{45}$ and $R^{46}$ is independently a monovalent perfluoro organic group which may have an ethereal oxygen atom or a fluorine atom, in the formula (u22), s is 0 or 1, each of $R^{51}$ and $R^{52}$ is independently a fluorine atom, a $C_{1-5}$ perfluoroalkyl group or may form a spiro ring together with each other (when s is 0), each of $R^{53}$ and $R^{54}$ is independently a fluorine atom or a $C_{1-5}$ perfluoroalkyl group, and $R55$ is a fluorine atom, a C1-5 perfluoroalkyl group or a C1-5 perfluoroalkoxy group, and in the formula (u24), each of $R^{71}$, $R^{72}$, $R^{73}$, $R^{74}$, $R^{75}$ and $R^{76}$ is independently a monovalent perfluoro organic group which may have an ethereal oxygen atom or a fluorine atom.

2. The catalyst layer according to claim 1, wherein the total content of units having a cyclic ether structure is at least 30 mol %, relative to all units in the polymer.

3. The catalyst layer according to claim 1, wherein the units having a cyclic ether structure comprise units represented by the formula (u22).

4. The catalyst layer according to claim 1, wherein the polymer further comprises units based on a perfluoro monomer which do not have a cyclic ether structure and have an ion exchange group.

5. The catalyst layer according to according to claim 4, wherein the units based on a perfluoro monomer are units represented by the after-mentioned formula (u32):

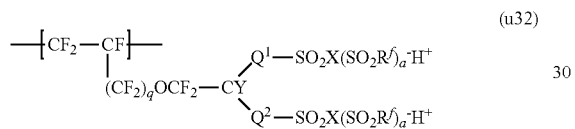

(u32)

wherein in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoro organic group, q is 0 or 1, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom.

6. The catalyst layer according to according to claim 1, wherein the polymer has an ion exchange capacity of from 1.1 to 2.8 meq/g dry resin.

7. The catalyst layer according to according to claim 1, wherein the polymer has a TQ value of 200 to 330° C.

8. A catalyst layer ink which comprises a carbon alloy catalyst, an ion exchange polymer which comprises at least one species of units having a cyclic ether structure selected from the group consisting of units represented by the formula (u11), units represented by the formula (u12), units represented by the formula (u21), units represented by the formula (u22) and units represented by the formula (u24), and a solvent:

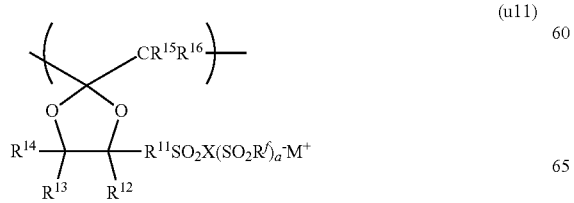

(u11)

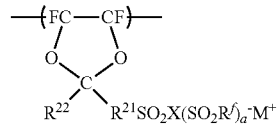

(u12)

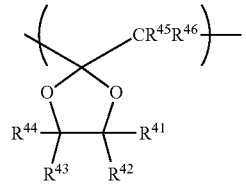

(u21)

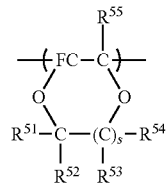

(u22)

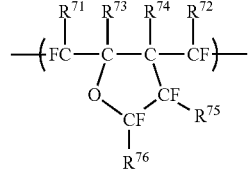

(u24)

wherein in the formula (u11), $R^{11}$ is a bivalent perfluoro organic group which may have an ethereal oxygen atom, each of $R^{12}$, $R^{13}$, $R^{15}$ and $R^{16}$ is independently a monovalent perfluoro organic group which may have an ethereal oxygen atom or a fluorine atom, and $R^{14}$ is a monovalent perfluoro organic group which may have an ethereal oxygen atom, a fluorine atom or a group represented by —$R^{11}(SO_2X(SO_2R^f)a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom, in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by —$R^{21}(SO_2X(SO_2R^f)a)^-M^+$ wherein $M^+$, $R^f$, X and a are the same as defined above, in the formula (u21), each of $R^{41}$, $R^{42}$, $R^{43}$, $R^{44}$, $R^{45}$ and $R^{46}$ is independently a monovalent perfluoro organic group which may have an ethereal oxygen atom or a fluorine atom, in the formula (u22), s is 0 or 1, each of $R^{51}$ and $R^{52}$ is independently a fluorine atom, a $C_{1-5}$ perfluoroalkyl group or may form a spiro ring together with each other (when s is 0), each of $R^{53}$ and $R^{54}$ is independently a fluorine atom or a $C_{1-5}$ perfluoroalkyl group, and $R^{55}$ is a fluorine atom, a $C_{1-5}$ perfluoroalkyl group or a $C_{1-5}$ perfluoroalkoxy group, and in the formula (u24), each of $R^{71}$, $R^{72}$, $R^{73}$, $R^{74}$, $R^{75}$ and $R^{76}$ is independently a monovalent perfluoro organic group which may have an ethereal oxygen atom or a fluorine atom.

9. The catalyst layer ink according to claim 8, wherein the total content of units having a cyclic ether structure is at least 30 mol %, relative to all units in the polymer.

10. The catalyst layer ink according to claim 8, wherein the units having a cyclic ether structure comprise units represented by the formula (u22).

11. The catalyst layer ink according to claim 8, wherein the polymer further comprises units based on a perfluoro monomer which do not have a cyclic ether structure and have an ion exchange group.

12. The catalyst layer ink according to claim 11, wherein the units based on a perfluoro monomer are units represented by the formula (u32):

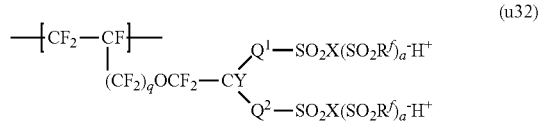
(u32)

wherein in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoro organic group, q is 0 or 1, $R^f$ is a linear or branched perfluoroalkyl group which may have an ethereal oxygen atom, X is an oxygen atom, a nitrogen atom or a carbon atom, and a is 0 when X is an oxygen atom, a is 1 when X is a nitrogen atom, and a is 2 when X is a carbon atom.

13. A membrane-electrode assembly which comprises an anode having a catalyst layer, a cathode having a catalyst layer and a polymer electrolyte membrane sandwiched between the anode and the cathode, wherein at least one of the catalyst layer in the anode and the catalyst layer in the cathode is the catalyst layer according to claim 1.

14. The membrane-electrode assembly according to claim 13, which is adapted for use for a polymer electrolyte fuel cell.

* * * * *